United States Patent
Xie et al.

(10) Patent No.: US 11,962,070 B2
(45) Date of Patent: Apr. 16, 2024

(54) ANTENNA STRUCTURE AND MOBILE TERMINAL

(71) Applicant: Beijing Xiaomi Mobile Software Co., Ltd., Beijing (CN)

(72) Inventors: Linping Xie, Beijing (CN); Fang Guo, Beijing (CN); Wei Wang, Beijing (CN); Jie Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 142 days.

(21) Appl. No.: 17/681,095

(22) Filed: Feb. 25, 2022

(65) Prior Publication Data
US 2023/0061494 A1    Mar. 2, 2023

(30) Foreign Application Priority Data

Aug. 31, 2021  (CN) .......................... 202111012025.X

(51) Int. Cl.
*H01Q 1/24*  (2006.01)
*H04B 1/40*  (2015.01)

(52) U.S. Cl.
CPC ............... *H01Q 1/243* (2013.01); *H04B 1/40* (2013.01)

(58) Field of Classification Search
CPC ........... H01Q 1/24; H01Q 1/243; H01Q 1/52; H01Q 21/28; H01Q 1/241; H01Q 1/244; H01Q 5/10; H01Q 5/328; H01Q 5/357; H04B 1/40
See application file for complete search history.

(56) References Cited

U.S. PATENT DOCUMENTS

| | | | | |
|---|---|---|---|---|
| 2010/0061040 | A1* | 3/2010 | Dabov | H04M 1/026 361/679.01 |
| 2014/0333486 | A1* | 11/2014 | Greetis | H01Q 1/243 29/601 |
| 2018/0366812 | A1* | 12/2018 | Kim | H01Q 1/44 |
| 2019/0386377 | A1* | 12/2019 | Dong | H04M 1/03 |
| 2020/0044319 | A1* | 2/2020 | Shen | H01Q 1/243 |

FOREIGN PATENT DOCUMENTS

| | | |
|---|---|---|
| CN | 105006645 A | 10/2015 |
| CN | 209641819 U | 11/2019 |
| EP | 2775376 A1 | 9/2014 |

OTHER PUBLICATIONS

Extended European Search Report dated Aug. 4, 2022 for European Patent Application No. 22158987.2.

* cited by examiner

*Primary Examiner* — Thai Pham
(74) *Attorney, Agent, or Firm* — Volpe Koenig

(57) ABSTRACT

An antenna structure is arranged at an edge region of a shell of a mobile terminal. The antenna structure includes at least one segment of antenna body and includes a first surface and a second surface opposite to each other, in which a first surface of the antenna body includes an attachment region attached to the edge region in a conformal manner. The antenna structure further includes a connecting portion connected to the antenna body, at least one of a first surface of the connecting portion and a second surface of the connecting portion being used for electrical connection with a feed unit of the mobile terminal or grounding.

20 Claims, 5 Drawing Sheets

ANTENNA STRUCTURE AND MOBILE TERMINAL

CROSS REFERENCE TO RELATED APPLICATIONS

The present application is based on and claims priority to Chinese Patent Application No. 202111012025.X filed on Aug. 31, 2021, the entire content of which is incorporated herein by reference for all purposes.

BACKGROUND

With the continuous development of mobile communication technology, the 5th Generation Mobile Communication Technology (5G) has gradually become popular. In order to increase market share and meet user requirements, mid-end and entry-level models produced by mobile terminal manufacturers are required to support 5G communication functions.

At present, antenna designs that can support 5G communication technology in the related art are either expensive and cannot be applied to mid-end and entry-level models, or are cumbersome to increase research and development costs and time.

SUMMARY

The disclosure relates to the technical field of antennas, in particular to an antenna structure and a mobile terminal.

According to a first aspect of the disclosure, an antenna structure is provided, arranged at an edge region of a shell of a mobile terminal, wherein the antenna structure comprises at least one segment of antenna body and comprises a first surface and a second surface opposite to each other, wherein a first surface of the antenna body comprises an attachment region attached to the edge region in a conformal manner.

The antenna structure further comprises a connecting portion connected to the antenna body, at least one of a first surface of the connecting portion and a second surface of the connecting portion being used for electrical connection with a feed unit of the mobile terminal or grounding.

According to a second aspect of the disclosure, a mobile terminal is provided, including a shell and an antenna structure, wherein the shell comprises an edge region, the antenna structure arranged at the edge region of a shell and comprises at least one segment of antenna body and comprises a first surface and a second surface opposite to each other, wherein a first surface of the antenna body comprises an attachment region attached to the edge region in a conformal manner.

The antenna structure further comprises a connecting portion connected to the antenna body, at least one of a first surface of the connecting portion and a second surface of the connecting portion being used for electrical connection with a feed unit of the mobile terminal or grounding.

BRIEF DESCRIPTION OF THE DRAWINGS

The accompanying drawings, which are incorporated in and constitute a part of this specification, illustrate embodiments consistent with the disclosure and together with the specification serve to explain the principles of the disclosure.

DETAILED DESCRIPTION

Figure 1:
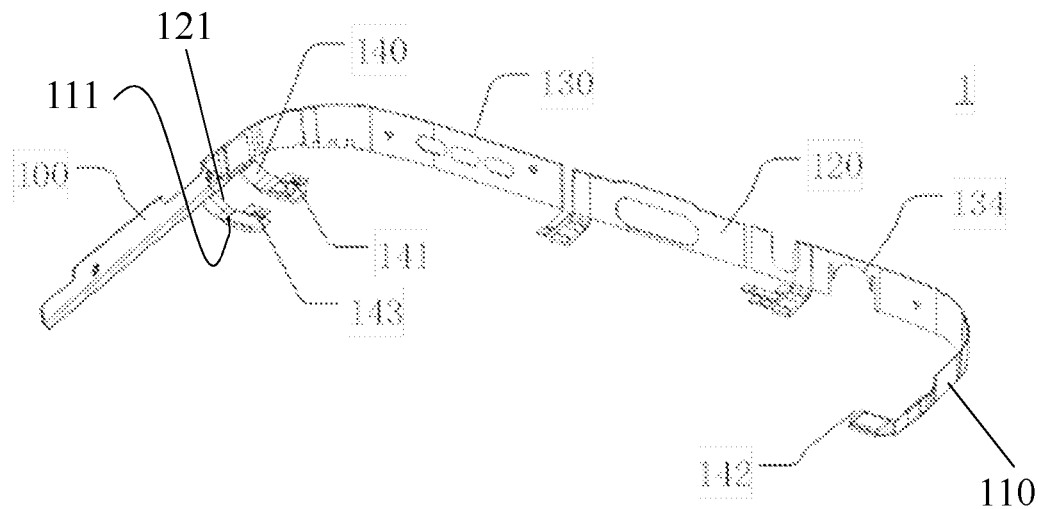
FIG. 1 is a schematic diagram of an antenna structure in accordance with an embodiment of the present disclosure.

Examples will be described in detail herein, implementations of which are illustrated in the accompanying drawings. When the following description refers to the accompanying drawings, the same numbers in different drawings represent the same or similar elements unless otherwise indicated. The implementations described in the following examples do not represent all implementations consistent with the disclosure. On the contrary, they are merely examples of an apparatus and a method consistent with some aspects of the disclosure as detailed.

With the continuous development of mobile communication technology, the 5G communication technology has gradually become popular. In order to increase market share and meet user requirements, mid-end and entry-level models produced by mobile terminal manufacturers are required to support 5G communication functions.

At present, antenna designs that can support 5G communication technology in the related art are either expensive and cannot be applied to mid-end and entry-level models, or are cumbersome to increase research and development costs and time.

In the related art, 5G antennas are mainly used in high-end flagship models. The design of 5G antennas relies on metal frames of mobile terminals. By grooving at preset positions of the metal frame the design and isolation of various frequency bands of antennas are realized. For example, grooves are formed at preset positions of a metal frame at the top, bottom and sides of a mobile terminal, and the grooves are filled with an insulating material to partition a complete metal frame into multiple segments of antennas to cover various frequency bands. Due to the high manufacturing costs and processing costs of the metal frame, the above antenna design cannot be widely used in entry-level models and mid-end models, so the application scope of this antenna design is limited.

Meanwhile, in the related art, there is another antenna design that can support 5G communication technology, in which the metal frame of the middle frame is covered with a layer of plastic by in-mold injection molding process as an outer surface of the mobile terminal. Because the metal frame will not be displayed to the user as an outer surface of the mobile terminal, the requirements of the surface treatment process for the metal frame are greatly reduced, which reduces the manufacturing costs of the mobile terminal, and enables such an antenna design to be applied to mainstream terminal models. However, this antenna design still relies on the metal frame, the manufacturing costs is still high and the antenna design cannot be used in entry-level models.

In order to enable the entry-level models to support 5G communication functions while maintaining low manufacturing costs, the following antenna design is used in the related art for entry-level models. The middle frame and shell of the mobile terminal are made of a relatively cheap material, such as plastic, different frequency bands of resonance are achieved by different segmental bent traces inside the mobile terminal to cover various frequency bands. For such antenna design, each segment of trace has a minimum width requirement. Generally, the width of each segment of trace is required to be not less than 1 mm, and a gap needs to be reserved between adjacent broken line segments of each segment of trace. The gap is usually required to be greater than 0.6 mm. When the above requirements are met, each trace should be connected to the middle frame or the shell, which puts forward higher requirements for the surface processing technology of the middle frame and the shell. For example, the middle frame and the shell cannot have larger radians, and the inner surfaces of the shell and the middle frame should be reserved for attachment surfaces to facilitate the fixing of each segment of trace.

In addition, because the antenna in this antenna design uses segmental bent traces, a normalized antenna design scheme cannot be formed. For different models of mobile terminal products, even if the requirements for 5G frequency bands are the same, antenna traces of each model need to be debugged and optimized for this product. As a result, the attachment surfaces reserved in the shell and the middle frame to which the segmental trace antenna is attached may not be completely adapted to the antenna, which is not conducive to overall design. To solve this problem, the area of the reserved attachment surfaces is expanded to cover the adjustment change of the segmental trace. However, as the overall design pursues the ultimate competitive environment, this method becomes increasingly burdensome. Otherwise, the shell is optimized according to the segmental trace design, so the reserved attachment surfaces need to be adjusted again, which increases the research and development costs and time.

In order to solve the problems in the related art, the disclosure provides an antenna structure, which is arranged at an edge region of a shell of a mobile terminal. The antenna structure is arranged at the edge region of the mobile terminal in a conformal attachment manner. With such an arrangement, the basic functions of the antenna body are realized. Meanwhile, the antenna structure in the disclosure is not required to form a multi-segment broken line by special processing for each segment of the antenna body, the processing and installation processes are simple, the design cost is saved, and the design speed is increased.

In an example there is provided an antenna structure, which is arranged at an edge region of a shell of a mobile terminal. The mobile terminal in this example may be terminal devices carried by a user, such as smart phones, tablet computers, or wearable devices; or smart home products such as sweeping robots; or vehicles such as patrol cars; or artificial intelligence devices such as unmanned aerial vehicles. Taking the smart phones as an example, the shell in this example includes a bottom shell and a frame of the mobile phone, the edge region of the shell may include a vertical surface of the frame facing a display screen and an inner wall region of the bottom shell connected to the frame, that is, the antenna body (described in detail later) may be attached to the inner side of the vertical surface alone, or attached to the inner wall of the bottom shell alone, or attached to the inner side of the frame while extending to a partial region of the inner wall of the bottom shell. According to different types and models of smart devices, the antenna body may be arranged in different ways. For example, when a body of the frame is wide enough and this is an enough region for attaching the antenna body, the antenna body can be attached only to the inner side of the vertical surface. For another example, when the body of the frame is relatively narrow and the region for attaching the antenna body is insufficient, the partial region of the bottom shell connected to the frame can be used to attach the antenna body, so that the antenna body can be attached to both the inner side of the vertical surface and the partial region of the inner wall surface of the bottom shell. For another example, when the body of the frame is too narrow to attach the antenna body, the antenna body can be attached to the partial region of the bottom shell connected to the frame.

Figure 2:
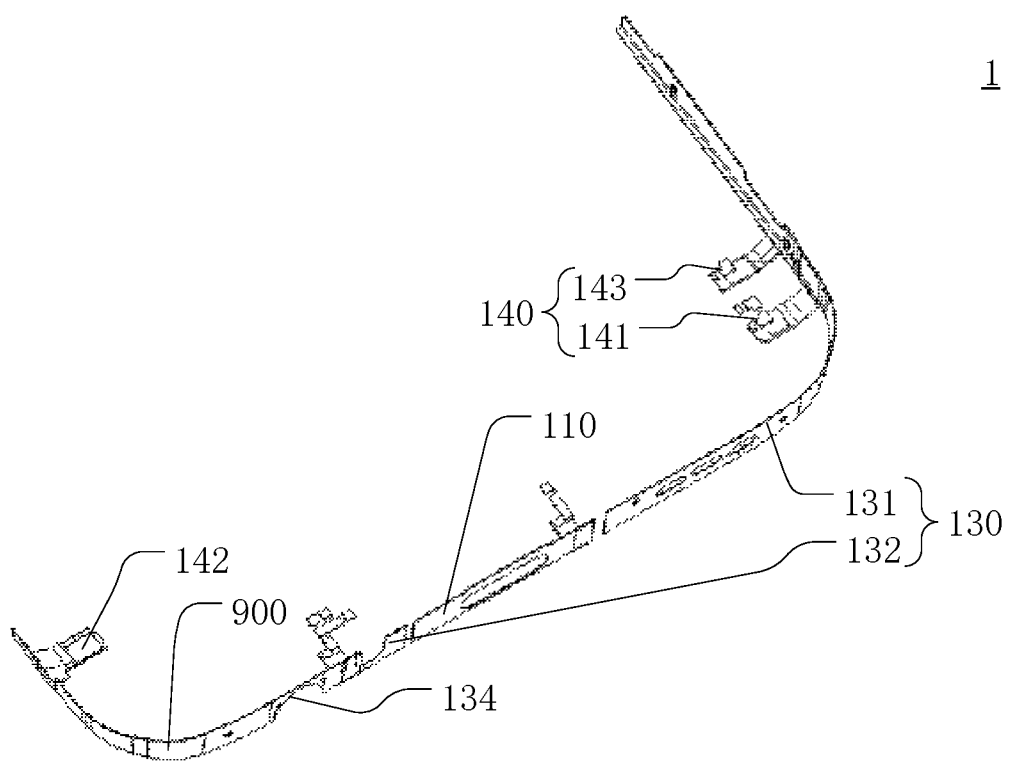
FIG. 2 is a schematic diagram of an antenna structure in accordance with an embodiment of the present disclosure.
Figure 3:
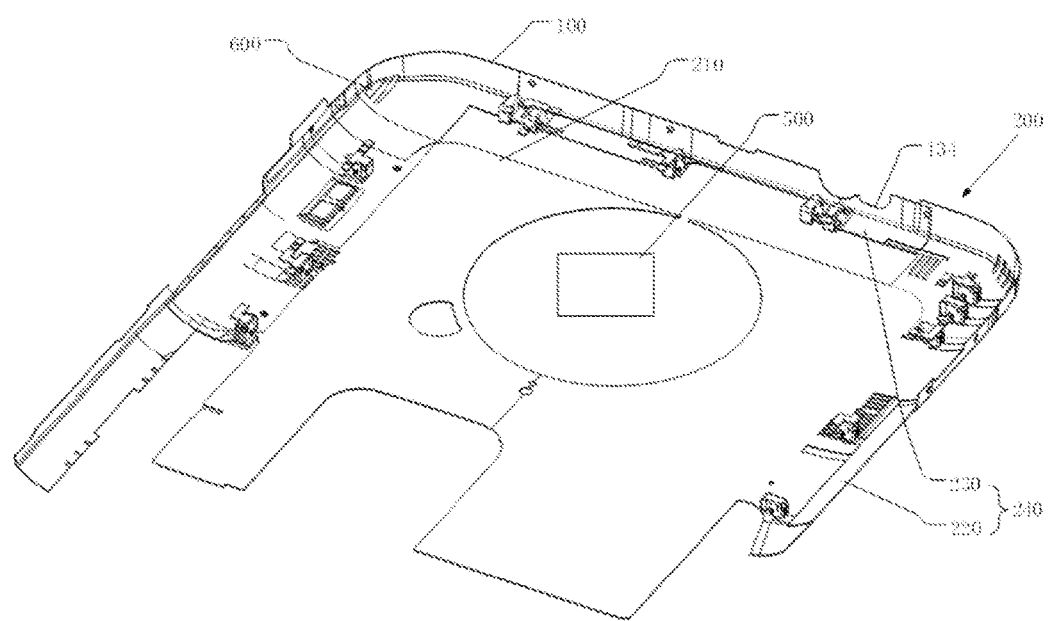
FIG. 3 is a schematic diagram of an antenna structure in accordance with an embodiment of the present disclosure.

As shown in FIGS. 1-3, the antenna structure 1 in this example includes at least one segment of antenna body 100, for example, may include only one segment of antenna body 100, or the antenna body 100 may include two or more segments. The antenna structure 1 includes a first surface 110 and a second surface 120 opposite to each other, and the at least one segment of antenna body 100 is arranged on a shell 200 and a frame 220 of the mobile terminal. The shell 200 in this example includes a bottom shell 230 and a frame 220. The frame 220 and the bottom shell 230 may be of an integral structure, or may be of separate structures and then assembled together. In addition to the practice that the antenna body 100 is attached to the frame 220 or the inner wall surface of the bottom shell 230 in a conformal manner, an extended segment of the antenna body 100 may also extend to the bottom shell 230 of the shell 200. The edge region of the shell 220 may include at least one of the vertical surface of the frame 220 and the inner wall surface of the bottom shell 230. That is, in some possible examples, the inner side of the vertical surface of the frame 220 serves as an edge region 240 for attaching the antenna body 100; in other possible examples, the inner side of the vertical surface of the frame 220 and a partial region of the inner wall surface of the bottom shell 230 serve as edge regions 240 for attaching the antenna body 100; in other examples, a partial region of the inside wall of the bottom shell 230 serves as an edge region 240 for attaching the antenna body 100.

It should be noted that the first surface 110 and the second surface 120 mentioned here are used to emphasize two opposite sides of the antenna structure 1, and do not involve specific regions and structures. Other structures (such as a connecting portion 140 below) may also have a first surface 111 and a second surface 121, that is, the first surface 110 of the antenna body 100 and the first surface 111 of the connecting portion 140 are located on the same side, and the second surface 120 of the antenna body 100 and the second surface 121 of the connecting portion 140 are located on the same side.

Figure 9:
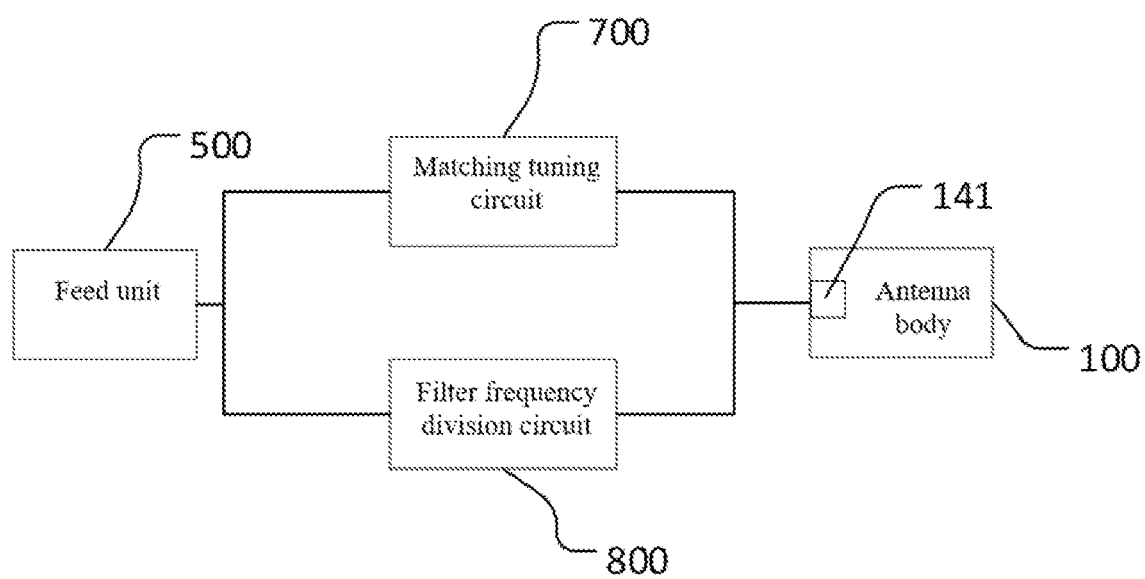
FIG. 9 is a block diagram of an antenna system in accordance with an embodiment of the present disclosure.

The region where the first surface 110 of the antenna body 100 is connected to the frame 220 and the bottom shell 230 is arranged on the edge region 240 in a conformal attachment manner. The edge region 240 is based on the shape of the frame 220 or the shape of the bottom shell 230 or both of the shape of the frame 220 and bottom shell 230. The approximate shape of the antenna body 100 is curved with the shape change of the frame 220. When necessary, the antenna body 100 extends to the partial region of the bottom shell 230 to form a conformal antenna. The first surface 110 of the antenna body 100 includes an attachment region 900 attached to the frame 220 in a conformal attachment manner (see FIG. 3). The second surface 121 of the connecting portion 140 or the first surface 111 of the connecting portion 140 or both of the second surface 121 of the connecting portion 140 and the first surface of the connecting portion 140 are used for electrical connection to, for example, a feed unit 500 (as shown in FIG. 9) of the mobile terminal or grounding.

In the example, a partial region of the second surface 121 of the connecting portion 140 or a partial region of the first surface 111 of the connecting portion 140 or both of the partial region of the second surface 121 of the connecting portion 140 and the partial region of the first surface 111 of the connecting portion 140 are used for electrical connection with the feed unit 500 by, for example, silver paste traces, a flexible printed circuit, etc. In another example, the other partial region of the first surface 111 of the connecting portion 140 or the other partial region of the second surface 121 of the connecting portion 140 or both of the partial region of the first surface 111 of the connecting portion 140 and the partial region of the second surface 121 of the connecting portion 140 are used for grounding. The feed unit 500 may be, for example, a component for sending out radio frequency signals. It should be noted that, in order to describe the grounding function and the function of receiving feed signals, the specific locations of the partial region and the other partial region involved in the above description are not limited, and can be adjusted according to the antenna structure.

The antenna structure in this example is made of metal material, such as copper or silver. The shell in this example is made of a relatively cheap material such as plastic and rubber, so as to reduce the manufacturing costs. The antenna body is formed from a sheet. When installed to the surface of the shell, the antenna body is deformed with the change in the shape of the shell, and is connected with the shell in a conformal manner.

The antenna structure in this embodiment is of a single length. The antenna structure of the single length is designed to work at a frequency corresponding to a single fundamental mode, and can also work at a high-order mode by adjusting the mode of the antenna structure according to the actual requirements in the later period, that is, the antenna structure of the single length determined by the fundamental modal frequency can also have multi-band working characteristics to achieve the technical effect of full coverage on various frequency bands. The fundamental mode refers to a mode at which the corresponding antenna structure has the lowest frequency that can generate effective resonance, and has the working mechanism corresponding to the lowest frequency. The high-order mode refers to a mode at which the corresponding antenna structure has higher frequencies that can generate effective resonance than in the fundamental mode, and has the working mechanism corresponding to the higher frequencies. Compared with the antenna design in the related art that the body of the antenna structure is processed into a multi-segment broken line and the broken line segments of different lengths correspond to different fundamental modes respectively, the antenna structure in this example is easy to process and install, saves the design costs, and increases the design speed.

In the example, as shown in FIG. 1 to FIG. 3, this example provides an antenna structure, which is arranged in a shell 200 of a mobile terminal, the antenna structure includes at least one segment of antenna body 100, and the antenna body 100 is of a single-length antenna. When the antenna body 100 has multiple segments, there is an interval between two adjacent segments of the antenna body 100. When the antenna structure is designed, the magnitude of the interval can be adjusted according to the actual requirements of the mobile terminal product, to enhance the coupling effect of the multiple segments of the antenna body, so as to increase the number of modes that can be supported by the antenna body 100 of the single length, and to further expand the frequency bands covered by the antenna structure and the bandwidths corresponding to the modes.

The antenna structure 1 in this example includes a first surface 110 and a second surface 120 opposite to each other, and all or part of the first surface 110 is continuously connected with the surface of the shell 200 of the mobile terminal. The antenna structure 1 further includes a connecting portion 140, the connecting portion 140 is connected to the antenna body 100, and the second surface 121 of the connecting portion 140 may be electrically connected to the feed unit 500 of the mobile terminal, and may also be grounded. In practical application, ground points and feed points on the first surface 111 and the second surface 121 of the connecting portion 140 are determined according to the design of the antenna structure. The ground points are used for grounding, and the feed points are used for connection with the feed unit 500. The antenna body 100 in this example may be a pre-processed metal sheet, and a Flexible Printed Circuit (FPC) may be used during processing.

The shell 200 is generally made of a non-metallic material that is non-conductive and relatively cheap, which can effectively reduce the manufacturing costs. In order to prevent the antenna structure from being exposed to a user's sight, the first surface 110 of the antenna structure in this example is attached to the inner surface of the shell 200 in a conformal attachment manner. During attachment, a double-sided adhesive tape can be arranged on the first surface 110 of the antenna structure in advance. The side of the double-sided adhesive tape used for bonding with the frame 220 is covered with a release film, and the release film is removed when the bonding is required, which is convenient and quick and improves the processing speed.

It can be understood that the antenna structure in this embodiment can also be processed by antenna manufacturing processes such as Laser Direct Structuring (LDS) and Printing Direct Structure (PDS), in addition to the above-mentioned flexible printed circuit. The antenna structure in this embodiment has no limitation or dependence on the processing method, as long as the processed antenna body and the shell are conformal.

The antenna body in this embodiment is arranged on the inner surface of the frame of the shell, and will not be exposed to the user's sight, it therefore makes lower requirements for the surface roughness of the antenna body, and lower processing difficulty and costs. Meanwhile, because the antenna structure in this example is independent to the shell, the shell does not need to be made of a metal material, but can be made of an inexpensive material, which further reduces the production costs. The antenna structure in this example can be used in entry-level models of mobile terminals.

In the example, as shown in FIG. 1 to FIG. 3, this example provides an antenna structure 1, including a multi-segment antenna body 100. The antenna structure 1 includes a first surface 110 and a second surface 120 opposite to each other, the entire region of the first surface 110 of the antenna body 100 is continuously connected to the frame 220 of the mobile terminal or the surface of the bottom shell 230 or both of the frame 220 and the bottom shell 230, that is, arranged on the inner surface of the edge region 240 in a conformal manner, the first surface 111 of the connecting portion 140 can be used for ground, and the second surface 121 of the connecting portion 140 is electrically connected to the feed unit 500 of the mobile terminal. In addition, the second surface 121 of the connecting portion 140 can also be used for grounding. Each segment of the antenna body 100 includes a trace segment 130 with a preset length, each trace segment 130 is electrically connected to the connecting portion 140, and the second surface 121 of the connecting portion 140 is electrically connected to the feed unit 500 of the mobile terminal. The connecting portion 140 and the trace segment 130 are of an integral structure, that is, the connecting portion 140 and the antenna body 100 are of an integral structure. It can be understood that the connecting portion 140 and the antenna body 100 may also be of separate structures. When the two are of separate structures, a stable electrical connection is formed between the connecting portion and the antenna body to realize the basic functions of the antenna.

In the example, the length of the antenna body is the length corresponding to the frequency band of a fundamental mode. When the antenna body includes multiple trace segments, each trace segment 130 has its own preset length, according to the frequency band and bandwidth that the antenna structure needs to cover, the preset lengths of different trace segments 130 can be designed to be the same or the different. Each trace segment 130 is of a single length, that is, the trace segment 130 is in a single fundamental mode, so multiple fundamental modes will not be realized through multiple broken line segments in the same trace segment 130, which facilitates production and assembly. Meanwhile, the antenna body 110 is further configured to excite high-order modes, so as to ensure wider working frequency bands of the antenna structure.

The antenna body 100 in the example is arranged on the frame 220 of the shell 200 or the inner surface of the bottom shell 230 or both of the frame 220 of the shell 200 and the inner surface of the bottom shell 230, the shell 200 is provided with preset structures 600, for example, provided with through holes for use by charging connectors, or protrusions arranged on the inner surface of the shell 200 and clamped with other devices, etc., that is, the edge region 240 of the shell 200 for attaching the antenna body 100 includes uneven regions. In order to avoid these preset structures 600, the trace segment 130 in this embodiment includes an avoidance portion 134, that is, the corresponding attachment region 900 includes an avoidance portion 134. The avoidance portion 134 may be, for example, an avoidance hole used to avoid a charging connector. The avoidance hole and the through hole have the corresponding position and have the same size, so that the charging connector passes through the through hole and the avoidance hole and is connected to a battery circuit to charge the mobile terminal. For another example, the avoidance portion 134 may also be a notch arranged on the trace segment 130, and the notch is used to avoid the protrusion. The avoidance portion 134 improves the connection reliability and stability between the antenna structure and the shell 200.

The connecting portion 140 in the example is provided with at least one of a feed port 141, a ground port 142 and an aperture tuning port 143. The feed port 141 is used for electrical connection with the feed unit 500 of the mobile terminal, and the feed unit 500 sends radio frequency signals to the feed port 141. The antenna structure transmits and receives signals, so that a communication connection can be realized between the mobile terminal and a base station or the like. The ground port 142 is used for connection with a structure on the mobile terminal to realize the grounding effect. The aperture tuning port 143 may be, for example, an aperture tuning switch. When the aperture tuning port 143 is opened, an aperture tuning operation can be performed on the trace segment 130. When the aperture tuning port 143 is closed, the aperture tuning operation cannot be performed on this trace segment 130. It should be noted that the aperture tuning port 143 is arranged on the connecting portion 140 connected to the trace segment covering low frequency bands to adjust the mode of the low frequency bands, and the aperture tuning port 143 is not arranged on the medium-high frequency bands. Of course, it can be understood that under normal circumstances, aperture tuning ports 143 may also be arranged on the medium-high frequency bands according to the requirements of the antenna design.

In the example, when the antenna structure is designed, the length of the trace segment 130 of the antenna structure is set to be in a suitable fundamental mode, and then the fundamental mode is adjusted to the working frequency band of the antenna structure in the current working state by the aperture tuning function and the matching tuning function, such as a high-order mode of the fundamental mode, to achieve multi-band coverage. The aperture tuning function can be realized by setting the aperture tuning port 143 above and opening the same for adjustment, and the matching tuning function can be realized by setting a matching tuning circuit 700 (as shown in FIG. 9). The matching tuning circuit 700 is electrically connected to the feed port 141, and the mode of the antenna structure is adjusted by adjusting components such as resistors and capacitors in the matching tuning circuit 700.

In the example, because the antenna structure and the surface of the shell are designed in a conformal manner, segmental bending design is no longer required for the trace segments of the antenna structure, there is no special requirement for the surface of the shell, the overall design flexibility is better, the appearance of entry-level models is comparable to that of high-end models, and the product competitiveness of entry-level models is improved.

The antenna structure in the example focuses on the single fundamental mode in the design process. By adjusting the feed position, while exciting the single fundamental mode, the high-order modes of the fundamental mode are excited and utilized to achieve multi-band coverage. In addition, large bandwidth coverage of the fundamental mode is achieved by matching tuning and aperture tuning on the trace segments 130. The antenna structure in this embodiment is simple, the frequency band and bandwidth design and debug of the antenna structure are transferred to a tuning circuit for design and optimization, so as to normalize the traces of the antenna structure. Therefore, the surface of the shell to which the antenna structure is attached can be predicted and locked in advance, which speeds up product development.

In the example, as shown in FIG. 1 to FIG. 3, this example provides an antenna structure, which is arranged on an inner surface of an edge region 240 of a shell 200 of a mobile terminal. The edge region 240 includes a partial region of an inner side of vertical surface of a frame 220, and a partial region of an inner wall surface of a bottom shell 230. The antenna structure includes a multi-segment antenna body 100 and a connecting portion 140. The antenna body 100 includes a trace segment 130, the trace segment 130 is connected to the connecting portion 140 and the two are of an integral structure. The antenna structure 1 includes a first surface 110 and a second surface 120 opposite to each other, the first surface 110 of the antenna body 100 is attached to the inner surface of the edge region 240 of the shell 200 in a conformal manner, and the first surface 111 of the connecting portion 140 may be provided with a ground point to achieve grounding; and the second surface 121 of the connecting portion 140 is electrically connected to a feed unit 500 of the mobile terminal for receiving feed signals. Alternatively, the partial region of the second surface 121 of the connecting portion 140 may also be provided with a ground point for grounding use. The connecting portion 140 is provided with at least one of a feed port 141, a ground port 142 and an aperture tuning port 143.

The trace segment 130 may be divided into a low frequency trace segment 131 and a medium-high frequency trace segment 132 according to the preset length of the trace segment 130. When the antenna structure is designed, part of the trace segment 130 may be arranged on a top 210 of the shell 200 of the mobile terminal or arranged at a bottom of the shell 200 according to the overall design. The trace segments 130 with different preset lengths work in different fundamental modes and correspond to different frequencies, that is, the preset length of a trace segment 130 can be determined by a fundamental mode alone, whereas the antenna structure in the related art uses multiple bent trace segments with different lengths to support multiple modes and frequency bands simultaneously.

Taking low frequency bands of 2G, 3G, 4G, and 5G as an example, when the antenna structure is designed, the trace segment 130 of the antenna structure can be designed to a suitable fundamental mode, such as corresponding to the B5 frequency band, but is not limited to this frequency band, and then adjusted to the required working frequency band by aperture tuning and matching tuning. The fundamental mode of any antenna structure has corresponding high-order modes, for example, the fundamental modes of low frequency bands of 2G, 3G, 4G, and 5G generally have 2-order, 3-order, and 5-order modes of the fundamental mode. For the B5 frequency band, the 4-order mode is just within the N77 frequency band of 5G. Therefore, although the fundamental mode is used as the target for setting the preset length when the antenna structure is designed in this example, the antenna structure can also work in high-order modes adapted to the fundamental mode, and has multi-band working characteristics, that is, the multi-band working characteristics of the antenna structure in this embodiment are determined by its high-order modes, instead of being determined by the fundamental modes corresponding to multiple segments of broken lines with different lengths in the antenna structure of the related art.

Figure 4:
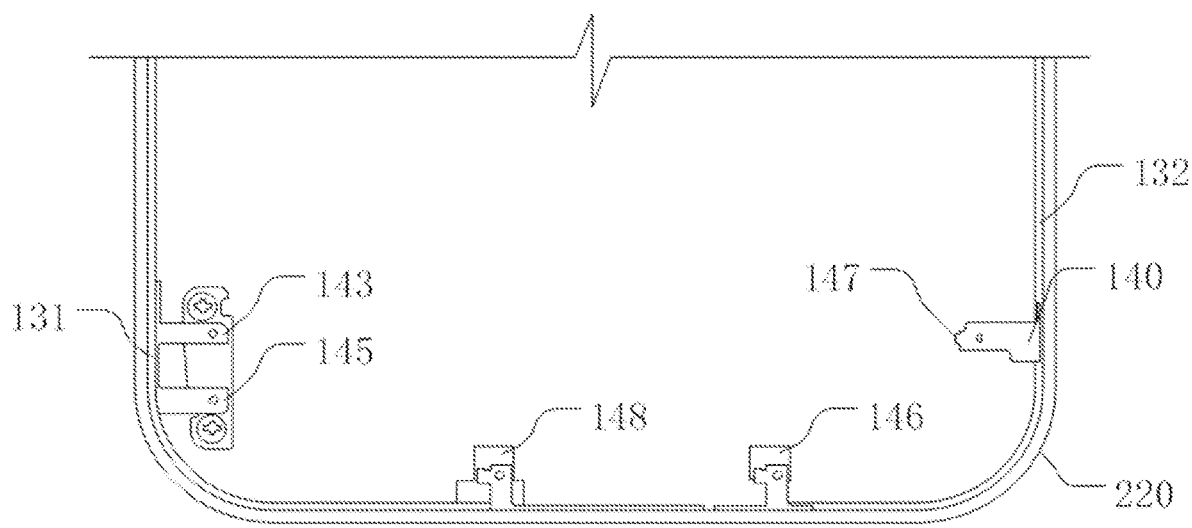
FIG. 4 is a schematic diagram of an antenna structure in accordance with an embodiment of the present disclosure.

In the example, FIG. 4 shows the design of a low frequency antenna and a medium-high frequency antenna, which are arranged on the inner surface of the edge region 240 of the shell 200. The connecting portion 140 connected with the low frequency trace segment 131 is provided with an aperture tuning port 143 and a low frequency feed port 145, and the connecting portion 140 connected with the medium-high frequency trace segment 132 is provided with a medium-high frequency feed port 146, a medium-high frequency ground port 147 and a parasitic ground port 148. The mobile terminal includes a matching tuning circuit 700, the feed unit 500 is electrically connected to the matching tuning circuit 700, and the matching tuning circuit 700 is electrically connected to the feed port 141 of the antenna structure 1. The feed unit 500 sends a control signal to adjust the working state of components of the matching tuning circuit 700, so as to control the antenna structure to work in high-order modes on the basis of the fundamental mode to cover multiple frequency bands.

The mobile terminal further includes a filter frequency division circuit 800, the feed unit 500 is electrically connected to the filter frequency division circuit 800, and the filter frequency division circuit 800 is electrically connected to the feed port 141 on the antenna body 100 of the antenna structure, to achieve cross-band bandwidth coverage, so as to support medium-high frequency bands and ultra-high frequency bands.

Figure 5:
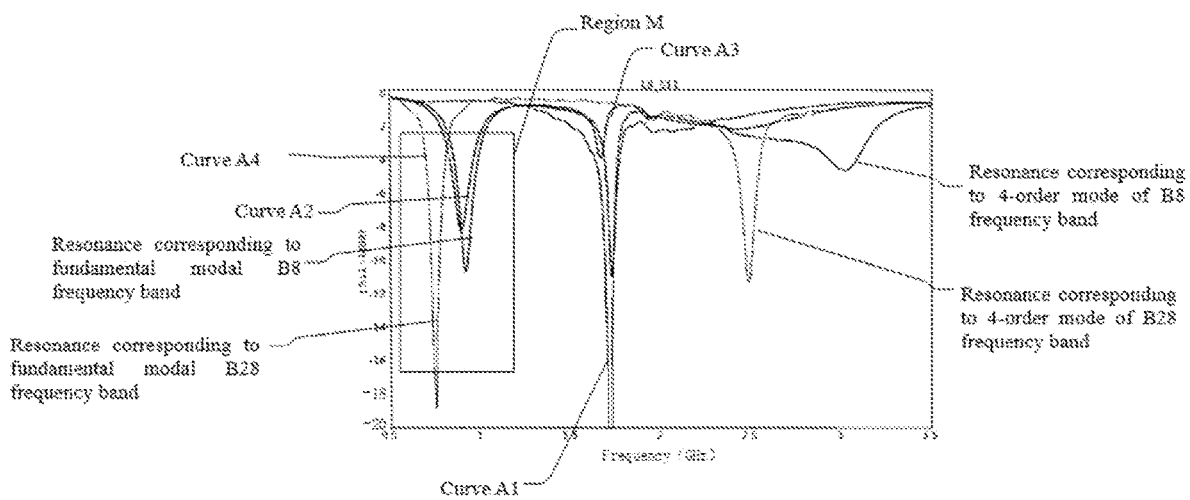
FIG. 5 is a resonance diagram of an antenna structure in accordance with an embodiment of the present disclosure.

During simulation testing on the antenna structure in this example, as shown in FIG. 5, a resonance frequency diagram (unit: dBa) of a parameter S11 in the low frequency band during the simulation process is shown. Referring to FIG. 5, the resonance shown by curve A1 shows that the preset length of the low frequency antenna is at one-half wavelength of 1.75 GHz. Because the low frequency antenna in this example uses the intermediate feed strategy shown in FIG. 4, the low frequency antenna also has a corresponding mode at a quarter wavelength of 1.75 GHz, and the corresponding frequency is about 875 MHz (that is, B8 frequency band), which is the lowest modal frequency at which the low frequency antenna can work. By applying appropriate aperture tuning measures at the aperture tuning switch, the low frequency antenna can cover a frequency band range of 700 MHz to 900 MHz, such as the resonance frequencies shown by curves A2, A3, and A4 of FIG. 5 in region M. The curve A4 corresponds to the B28 frequency band, and the curve A3 corresponds to the B8 frequency band, both of which are high-order modal resonances excited on the 4-order modes corresponding to their respective fundamental modes. In this example, when the aperture tuning is performed, the aperture tuning port 143 is opened, communicates with a modem of a base station, obtains frequency band resident network information from the modem, and performs control according to the frequency band resident network information, for example, performs aperture tuning by a general-purpose regulator.

Figure 6:
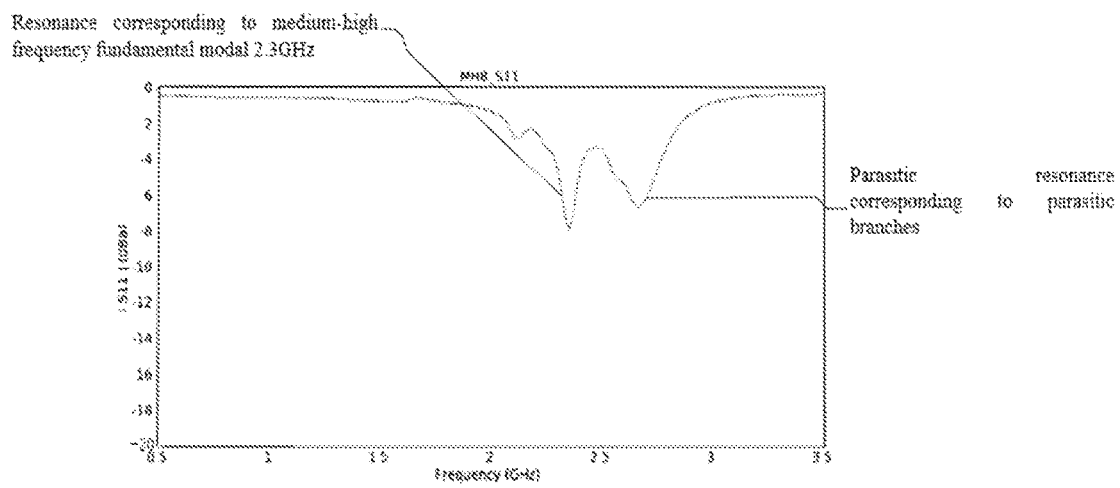
FIG. 6 is a resonance diagram of an antenna structure in accordance with an embodiment of the present disclosure.
Figure 7:
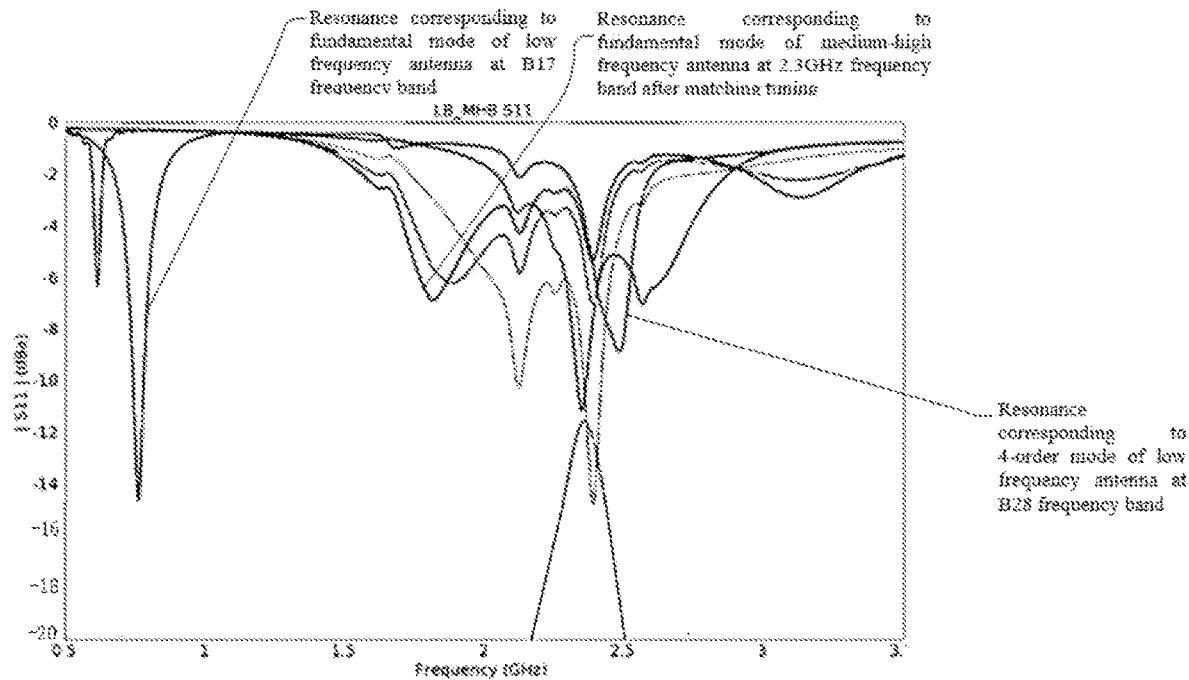
FIG. 7 is a resonance diagram of an antenna structure in accordance with an embodiment of the present disclosure.

As shown in FIG. 6, a resonance frequency diagram of a parameter S11 corresponding to the medium-high frequency antenna in FIG. 4 in a direct feed unmatched simulation state is shown, where the fundamental modal resonance of the medium-high frequency antenna and parasitic resonance produced by parasitic branches can be clearly seen. Both are single-mode resonance, corresponding to a single antenna length, and multi-mode resonance does not need to be achieved through multiple metal broken line segments. As shown in FIG. 7, after matching tuning is performed on the medium-high frequency antenna in FIG. 4, the resonances of two fundamental modes of the medium-high frequency antenna can cover all medium-high frequency bands from 1.71 GHz to 2.7 GHz. When the matching tuning is performed, the controller of the mobile terminal receives frequency band resident network information from the base station, and then applies control information to the controlled components, and realizing the matching tuning. Because the antenna body is designed to work in a single fundamental mode, the length of the antenna is determined by the wavelength corresponding to the single fundamental mode in which the antenna works. The antenna does not need to simultaneously excite multiple fundamental modes through multiple metal trace segments like the segmental trace antenna in the related art, and the antenna trace can achieve simple conformal attachment by fully using the inner surface of the shell to which the antenna is attached, which avoids many constraints on the surface of the attached shell due to multiple metal traces in the segmental trace antenna of the related art.

Figure 8:
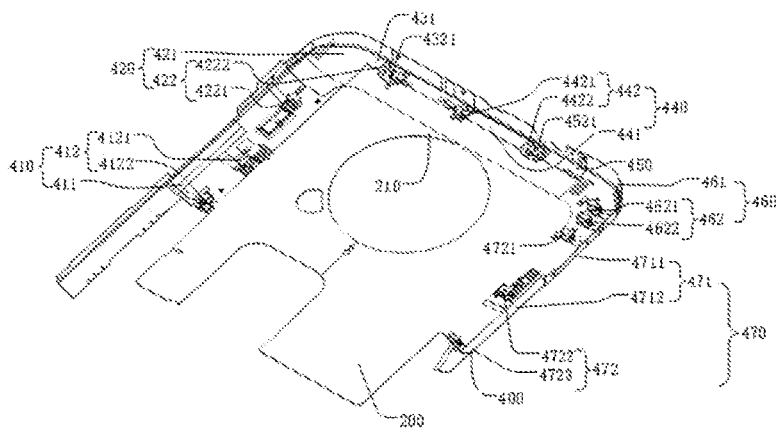
FIG. 8 is a schematic diagram of an antenna structure in accordance with an embodiment of the present disclosure.
Figure 8:
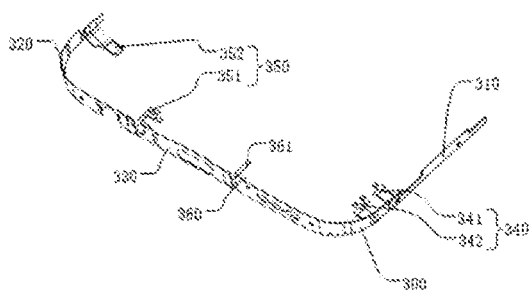

In another example, FIG. 8 shows the design of a low frequency antenna and a medium-high frequency antenna. The antenna structure includes a bottom antenna structure 300 arranged at the bottom of the frame 220 of the shell 200 of the mobile terminal, and a top antenna structure 400 arranged at the top 210 of the frame 220 of the shell 200. The top antenna structure 400 and the bottom antenna structure 300 respectively include multi-segment antenna bodies, and each segment of the antenna body includes a trace segment and a connecting portion. The preset lengths of the trace segments are different, so the antenna can be divided into a low frequency antenna and a medium-high frequency antenna. The bottom antenna structure 300 in this example includes a bottom low frequency antenna 310, a bottom medium-high frequency antenna 320, and a bottom medium-high frequency antenna parasite 330. The bottom low frequency antenna 310 is connected to a bottom low frequency connecting portion 340, and the bottom low frequency connecting portion 340 is provided with a bottom low frequency aperture tuning port 341 and a bottom low frequency feed and matching tuning port 342. The bottom medium-high frequency antenna 320 is connected to a bottom medium-high frequency connecting portion 350, and the bottom medium-high frequency connecting portion 350 is provided with a bottom medium-high frequency feed and matching port 351 and a bottom medium-high frequency ground port 352. The bottom medium-high frequency antenna parasite 330 is connected to a bottom parasite connecting portion 360, the bottom parasite connecting portion 360 includes a bottom parasite ground port 361, and the bottom medium-high frequency antenna parasite 330 is used to realize parasitic extended bandwidths. The bottom low frequency antenna 310, the bottom medium-high frequency antenna 320, and the bottom medium-high frequency antenna parasite 330 in this example are all attached to the inner surface of the bottom of the shell 200 in a conformal manner.

The top antenna structure 400 in this example includes seven segments of antenna bodies, the first antenna body 410 includes a first trace segment 411, the first trace segment 411 is connected to a first connecting portion 412, and the first connecting portion 412 includes a first feed port 4121 and a first ground port 4122. The second antenna body 420 includes a second trace segment 421, the second trace segment 421 is connected to a second connecting portion 422, and the second connecting portion 422 includes a second feed port 4221 and a second ground port 4222. The third antenna body 430 includes a third trace segment 431, the third trace segment 431 is connected to a third connecting portion, and the third connecting portion includes a third feed port 4321. The fourth antenna body 440 includes a fourth trace segment 441, the fourth trace segment 441 is connected to a fourth connecting portion 442, and the fourth connecting portion 442 includes a fourth feed port 4421 and a fourth ground port 4422. The fifth antenna body 450 includes a fifth trace segment, the fifth trace segment is connected to a fifth connecting portion, and the fifth connecting portion includes a fifth feed port 4521. The sixth antenna body 460 includes a sixth trace segment 461, the sixth trace segment 461 is connected to a sixth connecting portion 462, and the sixth connecting portion 462 includes a sixth feed port 4621 and a sixth ground port 4622. The seventh antenna body 470 includes a seventh trace segment 471, the seventh trace segment 471 is connected to a seventh connecting portion 472, the seventh trace segment 471 includes a first support arm 4711 and a second support arm 4712, and the seventh connecting portion 472 includes a seventh feed port a 4721, a seventh feed port b 4722, and a seventh ground port 4723.

The mobile terminal is in a flat state with the display screen facing upward, the first antenna body 410 and the second antenna body 420 are arranged on the left inner wall of the top 210 of the shell 200, the sixth antenna body 460 and the seventh antenna body 470 are arranged on the right inner wall of the top 210 of the shell 200, the third antenna body 430, the fourth antenna body 440 and the fifth antenna body 450 are arranged on the upper inner wall of the top 210 of the shell 200, and the antenna bodies are respectively attached to the inside wall of the top of the frame 220 of the shell 200 in a conformal manner.

In the example, according to the requirements of antenna structure design, a filter frequency division circuit 800 can also be arranged on the feed port of the antenna structure to achieve cross-band bandwidth coverage. For example, to support medium-high frequency bands of B1, B3 and B7 and ultra-high frequency bands of N77, N78 and N79. By means of aperture tuning, matching tuning and the like, the antenna structure in this example can realize 4*4 MIMO of 4G and 5G dual modes of high-end flagship handsets, which improves data download throughput and user experience.

The disclosure further provides a mobile terminal. The mobile terminal includes the antenna structure shown in the above examples. The mobile terminal may be terminal devices carried by a user, such as smart phones, tablet computers, or wearable devices; or smart home products such as sweeping robots; or vehicles such as patrol cars; or artificial intelligence devices such as unmanned aerial vehicles. Taking the smart phone as an example, the shell in this example includes a bottom shell and/or a frame of the phone.

Because the mobile terminal in the disclosure is provided with the antenna structure in the above examples, the mobile terminal is easy to process and install, has no dependence on the material and manufacturing process of the shell, ensures relatively low manufacturing costs, can also ensure the working performance of the antenna system, and is conducive to speeding up the design, saving design proofing costs, approaching the design limit of high-end models, and improving the appearance and cost performance of entry-level 5G communication models.

After considering the specification and practicing the disclosure disclosed herein, those skilled in the art would readily conceive of other embodiments of the present disclosure. The application is intended to cover any variations, uses or adaptive changes of the embodiments of the disclosure. These variations, uses or adaptive changes follow the general principle of the disclosure and include common general knowledge or conventional technical means in the technical field that are not disclosed in the disclosure. The specification and the embodiments are merely regarded as exemplary, and the real scope and spirit of the disclosure are indicated by the following claims.

It should be appreciated that the disclosure is not limited to the exact construction that has been described above and illustrated in the accompanying drawings, and that various modifications and changes may be made without departing from the scope thereof. The scope of the disclosure is only limited by the appended claims.

What is claimed is:

1. An antenna structure, arrangeable at an edge region of a shell of a mobile terminal made of a non-metallic material, wherein the antenna structure comprises at least one segment of an antenna body being flaky and comprises a first surface and a second surface opposite to each other, wherein the first surface of the antenna body comprises an attachment region attachable to the edge region in a conformal manner, wherein the antenna structure further comprises a connecting portion connected to the antenna body, at least one of a first surface of the connecting portion and a second surface of the connecting portion connectable with a feed unit of the mobile terminal or grounding electrically.

2. The antenna structure according to claim 1, wherein the attachment region comprises an avoidance portion configured to avoid a preset structure of the shell.

3. The antenna structure according to claim 1, wherein the connecting portion and the antenna body are of an integral structure.

4. The antenna structure according to claim 1, wherein the connecting portion and the antenna body are configured as separate structures and are electrically connected.

5. The antenna structure according to claim 1, wherein a length of the antenna body is a length corresponding to a frequency band in a fundamental mode.

6. The antenna structure according to claim 5, wherein the antenna body is further configured to excite high-order modes of the frequency band.

7. The antenna structure according to claim 1, wherein the connecting portion is provided with at least one of a feed port, a ground port and an aperture tuning port.

8. The antenna structure according to claim 7, wherein a feed unit of the mobile terminal is electrically connected to a matching tuning circuit of the mobile terminal, and the feed port of the connecting portion is connectable to the matching tuning circuit electrically.

9. The antenna structure according to claim 7, wherein a feed unit of the mobile terminal is electrically connected to a filter frequency division circuit of the mobile terminal, and the feed port of the connecting portion is connectable to the filter frequency division circuit electrically.

10. A mobile terminal, comprising a shell made of a non-metallic material and an antenna structure, wherein the shell comprises an edge region, and the antenna structure is arrangeable at the edge region of the shell, wherein the antenna structure comprises at least one segment of an antenna body being flaky and comprises a first surface and a second surface opposite to each other, wherein the first surface of the antenna body comprises an attachment region attachable to the edge region in a conformal manner, wherein the antenna structure further comprises a connecting portion connected to the antenna body, at least one of a first surface of the connecting portion and a second surface of the connecting portion connectable with a feed unit of the mobile terminal or grounding electrically.

11. The mobile terminal according to claim 10, wherein the attachment region comprises an avoidance portion configured to avoid a preset structure of the shell.

12. The mobile terminal according to claim 10, wherein the connecting portion and the antenna body are of an integral structure, or the connecting portion and the antenna body are configured as separate structures that are electrically connected.

13. The mobile terminal according to claim 10, wherein a length of the antenna body is a length corresponding to a frequency band in a fundamental mode.

14. The mobile terminal according to claim 13, wherein the antenna body is further configured to excite high-order modes of the frequency band.

15. The mobile terminal according to claim 10, wherein the connecting portion is provided with at least one of a feed port, a ground port and an aperture tuning port.

16. The mobile terminal according to claim 15, wherein a feed unit of the mobile terminal is electrically connected to a matching tuning circuit of the mobile terminal, and the feed port of the connection portion is connectable to the matching tuning circuit electrically.

17. The mobile terminal according to claim 15, wherein a feed unit of the mobile terminal is electrically connected to a filter frequency division circuit of the mobile terminal, and the feed port of the connecting portion is connectable to the filter frequency division circuit electrically.

18. The mobile terminal according to claim 10, wherein the edge region is made of a non-metallic material.

19. The mobile terminal according to claim 10, wherein an area of the edge region configured for attaching the antenna structure comprises an uneven area.

20. The mobile terminal according to claim 19, wherein the edge region is made of a non-metallic material.

* * * * *